US010263468B2

(12) United States Patent
Schmitz et al.

(10) Patent No.: US 10,263,468 B2
(45) Date of Patent: Apr. 16, 2019

(54) APPARATUS FOR TRANSMITTING DATA AND ENERGY BETWEEN TWO OBJECTS MOVING RELATIVE TO ONE ANOTHER

(71) Applicant: SICK AG, Waldkirch/Breisgau (DE)

(72) Inventors: Stephan Schmitz, Freiburg (DE); Martin Kufner, Elzach (DE); Michael Kerp, Waldkirch (DE); Boris Szerbakowski, Waldkirch (DE); Gregor Huber, Freiburg (DE)

(73) Assignee: SICK AG, Waldkirch/Breisgau (DE)

( * ) Notice: Subject to any disclaimer, the term of this patent is extended or adjusted under 35 U.S.C. 154(b) by 526 days.

(21) Appl. No.: 15/070,244

(22) Filed: Mar. 15, 2016

(65) Prior Publication Data

US 2016/0276871 A1 Sep. 22, 2016

(30) Foreign Application Priority Data

Mar. 16, 2015 (DE) .................... 10 2015 103 823

(51) Int. Cl.
*H01F 38/14* (2006.01)
*H02J 50/10* (2016.01)
(Continued)

(52) U.S. Cl.
CPC ............. *H02J 50/10* (2016.02); *H01F 27/00* (2013.01); *H01F 38/14* (2013.01); *H04B 5/0081* (2013.01); *H01F 2038/143* (2013.01)

(58) Field of Classification Search
CPC .... H01F 27/00; H01F 38/14; H01F 2038/143; H01F 27/006; H02J 50/10; H02J 5/005;
(Continued)

(56) References Cited

U.S. PATENT DOCUMENTS 5,498,911 A 3/1996 Bossler et al.
2008/0243429 A1* 10/2008 Yoshino ............... G01C 15/002
702/159
(Continued)

FOREIGN PATENT DOCUMENTS

DE 4120650 A1 12/1992
DE 4407277 A1 9/1994
(Continued)

OTHER PUBLICATIONS

English translation of Japanese Notice of Allowance dated Aug. 29, 2017 issued in corresponding Japanese Application No. 2016-046007.

*Primary Examiner* — Thienvu V Tran
*Assistant Examiner* — Brian K Baxter
(74) *Attorney, Agent, or Firm* — Nath, Goldberg & Meyer; Jerald L. Meyer

(57) ABSTRACT

The invention relates to an apparatus for the transmission of data and energy between two objects moving relative to one another about a common axis of rotation. The objects each comprise coils which are disposed opposite and are spaced apart axially with respect to the axis of rotation such that an energy transmission between the coils is possible by inductive coupling. A respective electrode carrier having a respective electrical conductor is provided coaxially to and rotationally fixed with respect to the respective coils, wherein the electrode carriers are disposed opposite and spaced apart axially and the electrical conductors are arranged such that a data transmission between the electrical conductors is possible by electrical coupling. The electrical conductors are circular or part-circular and are concentric to the axis of rotation of the relative movement. In addition, the respective coil windings and electrical conductors are arranged concentric to one another. The respective coil carriers and electrode carriers are formed in one piece and as a respective (Continued)

Figure 1:
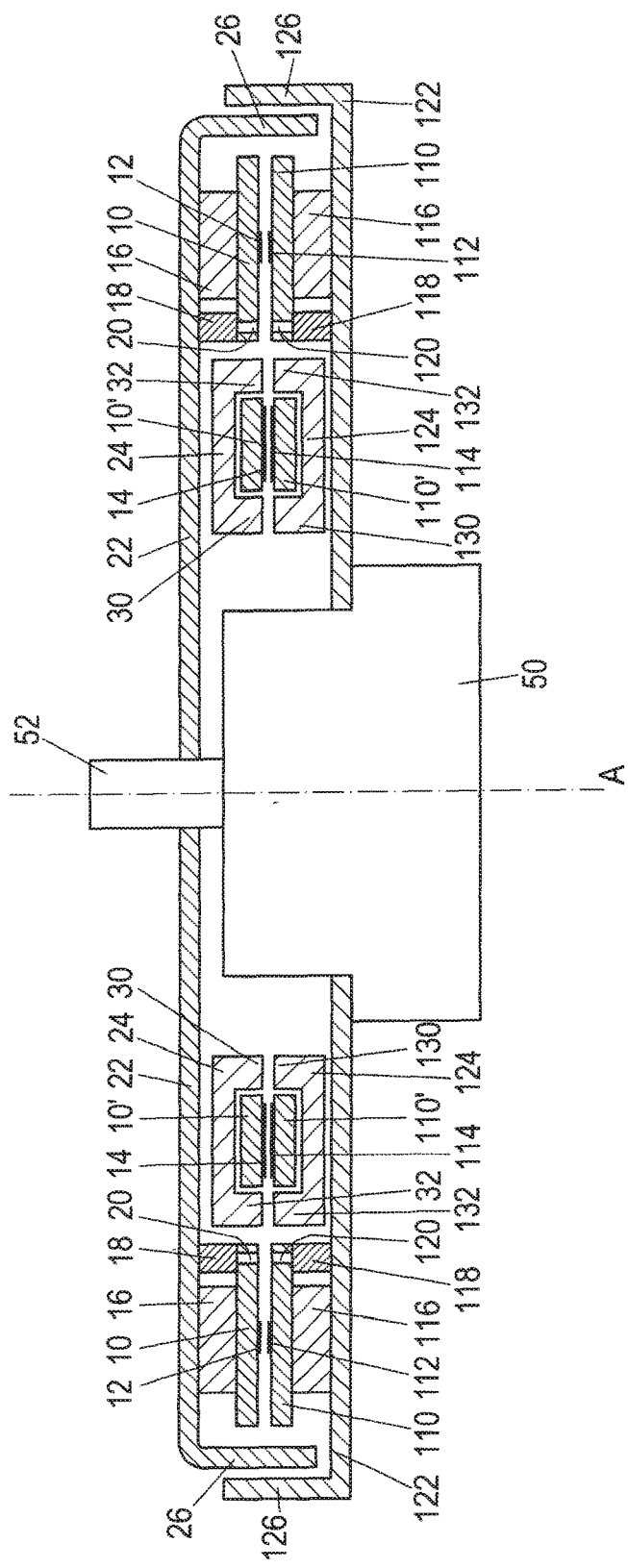

circuit board. A respective arrangement of conductive material for shielding is provided between the first coil and the electrical conductor coaxial thereto and/or between the second coil and the electrical conductor coaxial thereto. The arrangement for the electrical shielding comprises bores in the circuit board in the radial region between the coil and the electrical conductor in which bores conductive material is located. The invention furthermore relates to a laser scanner having such a transmission apparatus in accordance with the invention.

17 Claims, 3 Drawing Sheets

(51) Int. Cl.
*H01F 27/00* (2006.01)
*H04B 5/00* (2006.01)

(58) Field of Classification Search
CPC .. H02J 7/025; H02J 17/00; H02J 50/90; H02J 50/80; H02J 50/70; H02J 50/60; H02J 50/50; H02J 50/40; H02J 50/30; H02J 50/27; H02J 50/23; H02J 50/20; H02J 50/15; H02J 50/12; H02J 50/05; H02J 50/00; H04B 5/0037; B60L 5/005; B60L 11/182; H02G 7/16; Y02T 90/122
USPC ........................................... 307/104
See application file for complete search history.

(56) References Cited

U.S. PATENT DOCUMENTS

| 2015/0228403 | A1* | 8/2015 | Zwemmer | H01F 38/18 307/104 |
| 2015/0303699 | A1* | 10/2015 | Wagman | H02J 5/005 307/104 |
| 2016/0027576 | A1* | 1/2016 | Stein | F04D 27/0215 455/41.1 |
| 2016/0327444 | A1* | 11/2016 | Ichikawa | G01L 3/108 |
| 2016/0352148 | A1* | 12/2016 | Ichikawa | G01L 3/101 |

FOREIGN PATENT DOCUMENTS

| DE | 19532043 A1 | 3/1997 |
| DE | 102014105261 B3 | 2/2015 |
| JP | S49-97713 | 12/1972 |
| JP | S59-44017 U | 3/1984 |
| JP | S59-155715 U | 10/1984 |
| JP | S61-174703 A | 8/1986 |
| JP | H4-336406 A | 11/1992 |
| JP | 5-201337 A | 8/1993 |
| JP | H11-354346 A | 12/1999 |
| JP | 2000-357619 A | 12/2000 |
| JP | 2007-36341 A | 2/2007 |
| WO | 2009/033573 A1 | 3/2009 |

* cited by examiner

APPARATUS FOR TRANSMITTING DATA AND ENERGY BETWEEN TWO OBJECTS MOVING RELATIVE TO ONE ANOTHER

The invention relates to an apparatus for the contactless transmission of data and energy between two objects moving relative to one another about a common axis of rotation, wherein the first object comprises a first coil and the second object comprises a second coil, wherein the coils are disposed opposite and axially spaced apart with respect to the axis of rotation such that an energy transmission is possible between the two coils by inductive coupling. The invention furthermore relates to a laser scanner having such an apparatus.

With objects rotating relative to one another, it is often necessary that energy and data are transmitted between the two objects moving relative to one another. It is, for example, often necessary in today's applications that energy and data signals are transmitted between a steering column in a fixed position in a motor vehicle and the steering wheel. It is thus e.g. necessary to transmit energy to the steering wheel to be able to trigger the ignition of an airbag installed therein. On the other hand, data signals have to be transmitted, e.g. after pressing the horn, so that the correspondingly requested action is carried out in the motor vehicle.

Another application can e.g. be found in corresponding designs of laser scanners for monitoring an environment. Energy and data signals are here e.g. exchanged between a rotating sensor head and a fixed-position evaluation and supply unit.

DE 195 32 043 A1 describes a steering wheel for a vehicle in which energy is ensured between the steering column and the steering wheel rotating relative thereto via an inductive coupling of corresponding coil systems. DE 195 32 043 A1 provides a transmission on an inductive basis or on an electro-optical base for the signal transmission.

The opto-electric transmission in accordance with DE 195 32 043 A1 requires additional optical elements. The possible data rates are, on the other hand, very limited in volume on an inductive transmission of data. As a rule, a maximum of several 10 kbits is thus possible, which is not sufficient for many applications.

DE 44 07 277 A1 describes a transmitter for energy between two elements rotating relative to one another. For this purpose, two coil carriers are provided in the form of printed circuit boards on which coil windings are provided substantially concentrically to the axis of rotation of the relative movement and serving for the transmission of energy between the objects moving relative to one another via an inductive coupling. The coils are interspersed with ferrite cores which effect or promote the magnetic coupling. This arrangement is also used for the transmission of information in accordance with DE 44 07 277 A1.

DE 41 20 650 A2 describes the transmission of energy and data between the steering column and the steering wheel of a motor vehicle. An inductive coupling is effected via two oppositely disposed coils with which the energy can be transmitted between the two objects moving relative to one another. The coil windings in this respect have approximately the same extent in the axial direction as in the radial direction. Capacitor electrodes, which are used for transmitting data, are located radially or axially remote from the coils at the objects rotating relative to one another.

DE 10 2014 105 261 B3 describes an apparatus for transmitting data and energy between two objects rotating with respect to one another. Coil windings with whose aid energy is inductively transmitted are provided on two circuit boards rotating with respect to one another. A data transmission takes place via electrodes which are likewise provided on the circuit board and concentrically to the coil windings. DE 10 2014 105 261 B3 describes an apparatus having the features of the preamble of claim 1.

It is the object of the present invention to provide an apparatus with which both the transmission of energy and the transmission of data between two objects moving relative to one another about an axis of rotation is effected contactlessly in a simple, effect, compact, and non-interference prone manner such that the apparatus can also be used when only a little construction space is available.

This object is satisfied by an apparatus for the contactless transmission of data and energy having the features of claim 1. Dependent claims are directed to preferred embodiments. A laser scanner having an apparatus in accordance with the invention for transmitting data and energy is the subject of claim 17.

The apparatus in accordance with the invention for transmitting data and energy between two objects moving relative to one another about a common axis of rotation has a first coil at the first object and a second coil at the second object. The second coil is disposed opposite the first coil spaced apart axially with respect to the axis of rotation such that a contactless energy transmission is possible between the two coils by inductive coupling.

A first disk-shaped or annular disk-shaped electrode carrier having a first electrical conductor is provided coaxially to and rotationally fixed with respect to the first coil. A second disk-shaped or annular disk-shaped electrode carrier having a second electrical conductor is provided coaxially to and rotationally fixed with respect to the second coil opposite the first electrode carrier. The electrode carriers are disposed opposite and axially spaced apart and the first and second electrical conductors are arranged such that a data transmission is possible between the first and second electrical conductors by contactless electrical coupling.

The term "electrical coupling" between the first and second electrical conductors is here therefore to be understood as a contactless capacitive coupling.

The coil or coils are concentric to the axis of rotation of the relative movement of the objects, whereby the arrangement in accordance with the invention can be handled simply and easily. The electrical conductors for the data transmission are of circular or part-circular design, with the circles or part-circles being concentric to the axis of rotation of the relative movement.

The first object comprises a first disk-like or annular disk-like coil carrier which bears the first coil and the second object comprises a second disk-shaped or annular disk-shaped coil carrier which bears the second coil. Such disk-shaped or annular disk-shaped coil carriers are simple to produce and can e.g. be processed by lithographic processes to apply the coils thereto.

In addition, not only the electrode carriers are of a disk-shaped or annular disk-shaped design and are disposed opposite and axially spaced apart for the data transmission, but also the coils on the coil carriers of disk-shaped or annular disk-shaped design are disposed opposite and axially spaced apart to allow the inductive coupling for the energy transmission. A very compact and simple design is ensured in this manner. It is in this respect particularly simple and advantageous that the coil carriers in the invention are directly designed as circuit boards on which the respective coil windings are applied for the energy transmission. The electrode carriers equally comprise circuit boards onto which the electrical conductors are applied for the data transmission. The metallic coil windings for the energy transmission or the electrical conductors for the data transmission can be produced very simply on circuit boards by lithographic processes known per se (e.g. vacuum deposition or etching).

The geometry of the coil windings or of the electrical conductors can be fixed in a simple manner in this way and the circuit boards can themselves serve as carriers for the coil windings or for the electrical conductors. It is particularly simple and inexpensive in manufacture for the first coil carrier and the first electrode carrier to be provided in one piece at the first object in the invention (that is to be able to formed by one part) and for the second coil carrier and the second electrode carrier to be in one piece at the second object. A respective only one circuit board has to be provided per object in this manner. The respective coil for the energy transmission and the respective electrical conductor for the data transmission are then provided on this circuit board and can e.g. be simultaneously processed in manufacture.

Since the coil carriers or the electrode carriers are provided as circuit boards, it is possible in a space-saving manner to provide further components and connection lines—in particular electronic components and connection lines.

The coils are advantageously designed as two-dimensional. This means that they comprise coil windings which are arranged next to one another on a surface of the respective disk-shaped or annular disk-shaped coil carrier. It is generally possible that a respective further two-dimensional coil which amplifies the inductive coupling, e.g. via a ferrite structure, is provided on the second surface of the respective coil carrier.

It is, however, preferred if the coil windings of the first coil (at the first object) and the coil windings of the second coil (at the second object) are disposed opposite at the opposite sides of the two coil carriers such as is also described further below with respect to the embodiment shown in the Figures.

In the apparatus in accordance with the invention, an arrangement of conductive material is additionally provided for the electrical shielding between the first coil and the first electrical conductor and/or between the second coil and the second electrical conductor, in each case coaxially between the coil and the conductor. It is thus possible in an effective manner effectively to restrict interference to the data transmission via the electrical conductors by the inductive energy transmission arranged adjacent thereto via the coils despite the compact arrangement of the apparatus. A small construction shape is nevertheless possible because the inductive energy transmission and the electrical data transmission do not have to be far apart spatially to prevent the electromagnetic interference which otherwise occurs.

Provision is made in the invention, for shielding between the energy-transmitting coils and the data-transmitting electrodes, that bores are provided in the respective circuit board between the coil windings and the electrical conductor and conductive material is present in said bores. Such a shielding can be implemented particularly simply.

Provision can particularly preferably be made for this purpose that the inner peripheries of the bores in the circuit boards are coated with metallic material to effect a shielding which can be implemented in a simple manner without weakening the carrier structure too much.

It is particularly advantageous if the apparatus has a first housing shell of conductive material and/or a second housing shell of conductive material, with the first housing shell being rotationally fixed to the first object and the second housing shell being rotationally fixed to the second object. The housing shells of conductive material serve for the electrical shielding of the system to the outside and effectively prevent interference by external influences.

In addition, housing shells arranged and designed in this manner provide a connection to the virtual ground in that they effect a capacitive coupling between the real ground and the virtual ground.

It is particularly advantageous if the first housing shell is in this respect electrically connected to the electrical arrangement between the coil windings of the first coil and of the first electrical conductor and if the second housing shell is electrically connected to the electrical arrangement of conductive material for the electrical shielding between the coil windings of the second coil and the second electrical conductor.

In this manner, the shielding arrangements between the respective coil windings and electrodes are electrically connected to a respective housing shell such that an effective shielding of the data transmission is provided with respect to any external influences and in particular also with respect to the influences of the coils used for energy transmission. Only that side of the electrode carrier which is directly opposite the electrode carrier on the other relatively rotating object is not surrounded by the shielding.

The connection can, for example, be formed by a conductive annular structure, e.g. conductive foam, which is arranged coaxial to the axis of rotation between the coil and the electrode.

The shielding by the housing shells is particularly effective when the two housing shells each comprise an angled region at their radially outer regions, with the angled regions of the two housing shells being radially spaced apart and next to one another. The greater the overlapping region of the shielding (in particular of the housing) is and the smaller the spacing of the overlapping regions is, the better the shielding effect is.

An arrangement of magnetic material advantageously surrounds that region of the respective coil carrier on which the respective coil is located, at least it its radially outer periphery, and/or is arranged in its radial interior. If the coil carriers of each of the objects moving relative to one another have a corresponding arrangement of magnetic material, the inductive coupling for the energy transmission is effectively amplified by the transformatory effect.

In addition, a corresponding arrangement of magnetic material which surrounds the region of the coil carriers can have a further shielding effect which prevents the inductive energy transmission from negatively influencing the electrical data transmission.

This magnetic arrangement is particularly advantageously produced from soft magnetic material, in particular "ferrite".

The arrangement of magnetic material at the respective object has a particularly efficient and effective effect if it has a circular or part-circular section which is concentric to the axis of rotation of the relative movement of the objects, which passes through the circuit board and/or which has a second circular or part circular section which is concentric to the axis of rotation of the relative movement of the objects, which passes through the circuit board and which has a greater radius than the first section.

It is thus possible to surround a coil on the circuit board arranged concentric to the axis of rotation of the relative movement of the objects with the magnetic arrangement in the peripheral direction. The inductive coupling by the coils is intensified in this manner and the shielding is improved, on the other hand.

Provision can be made that a drive motor for generating the relative movement of the two objects or the drive shaft of a corresponding drive motor passes through the circuit boards to ensure a design which is as compact as possible.

A substantially rotationally symmetrical arrangement and embodiment of the individual elements of the apparatus in accordance with the invention and of their preferred embodiments about the axis of rotation of the relative movement is advantageous due to the simple manufacture, the simple handling and the simple operation.

In addition, the apparatus in accordance with the invention and its particularly preferable embodiments allows a data transmission in the single-figure 100 MHz range at data rates of approximately 30 Mbit due to the good shielding, in particular between the data-transmitting electrodes and the energy-transmitting coils, whereby a less expensive and more power-saving operation is possible than if a data transmission in the GHz range is provided.

The apparatus in accordance with the invention for the transmission of energy and data can be used particularly advantageously in laser scanners in which a sensor head rotates relative to a supply unit. The compact construction shape and the nevertheless precise data transmission are in particular advantageous here which can be achieved by the apparatus in accordance with the invention for the transmission of energy and data and its advantageous embodiments.

Preferred embodiments result from the dependent claims, from the enclosed Figures and/or from the embodiments described in the following.

Figure 2:
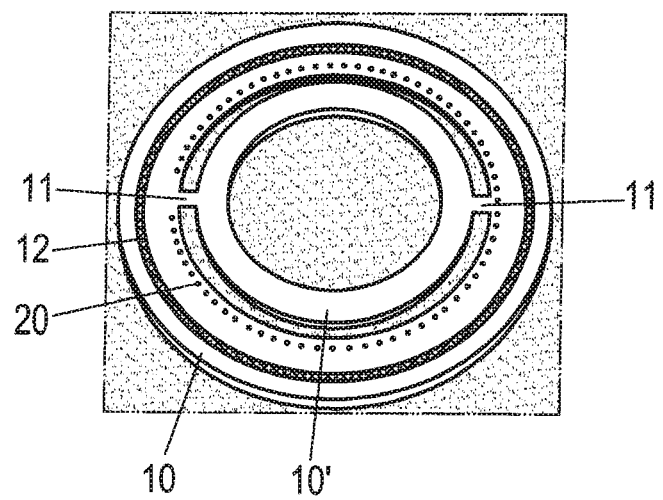
Figure 3:
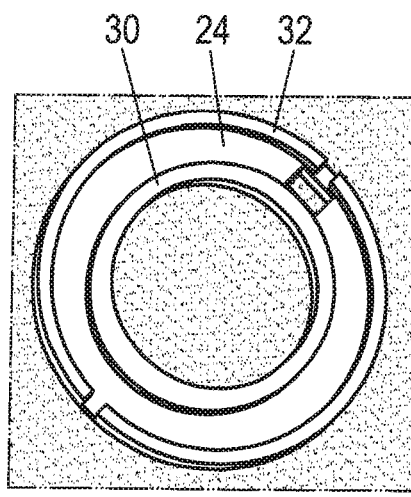
Figure 4:
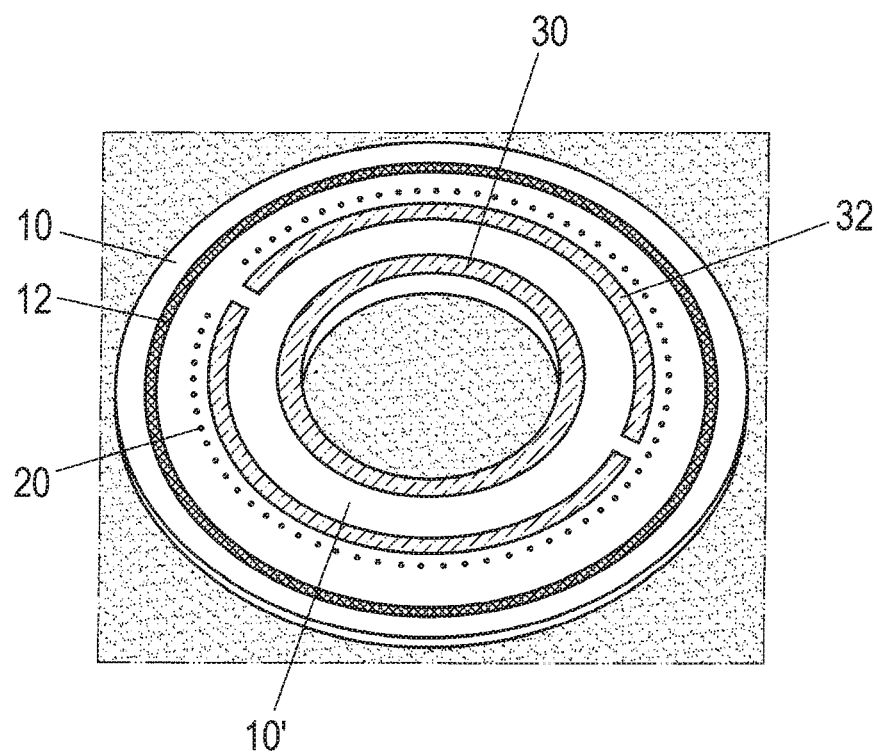

The invention will be explained in detail with reference to the enclosed Figures which show an embodiment. There are shown:

FIG. 1 an embodiment of an apparatus in accordance with the invention in a schematic representation in a lateral section;

FIG. 2 a slightly perspective plan view of a circuit board for use in an embodiment of the apparatus in accordance with the invention;

FIG. 3 a ferrite arrangement for use in an arrangement in accordance with the invention of FIG. 1 or 2; and FIG. 4 a representation in which the ferrite arrangement of FIG. 3 and the circuit board of FIG. 2 are assembled.

FIG. 1 shows an embodiment of an apparatus in accordance with the invention in a lateral section in a schematic representation. In the lateral section, two oppositely disposed circuit boards 10, 110 can be seen which are movable relative to one another against one another about the axis A.

FIG. 2 in particular shows the circuit board 10 in a direction of view which would be from below in FIG. 1. That side of the circuit board 10 can therefore be seen here which is opposite the circuit boards 110.

A coil 14 having coil windings which are substantially concentric to the axis of rotation A of the relative movement is located on the radially inner region 10' of the circuit board 10 at that side which is opposite the circuit board 110. These coil windings are shown schematically in the section of FIG. 1 as only one black bar at the lower side of the circuit board section 10'. In FIG. 2 the coil on the circuit board in its region 10' is not shown. The coil windings are formed by vacuum deposited or etched conductor tracks on the respective circuit board. The same reference numeral 14 is used in the present text for the coil 14 on the circuit board 10 and for the coil windings forming it for reasons of a simple representation.

An electrode 12 which is arranged in ring shape concentrically to the axis of rotation A as a conductor track is located in the outer region of the circuit board 10 at that side which is opposite the circuit board 110. This electrode 12 can be recognized in section in FIG. 1 and in a plan view in FIG. 2.

It is not recognizable in FIG. 1, but is clearly visible in FIG. 2 that that circuit board region of the circuit board 10 on which the electrode 12 is applied and the circuit board region 10' on which the coil 14 is applied are connected to one another by corresponding radial webs 11. In the embodiment described, the coil carrier region 10' and the electrode carrier with the electrode 12 therefore form a one-piece circuit board 10.

The circuit board 10 is connected via one or more insulating spacers 16 (FIG. 1) to a metallic housing shell 22 which can, for example, comprise a deep drawn metal sheet. In the embodiment described, this housing shell 22 is rotationally fixedly connected to the drive shaft 52 of a drive motor 50 so that the housing shell 22 rotates together with the circuit board 10 and the structures applied thereto.

A shielding structure 18, 20, which is designed as follows in the described embodiment, is provided in or at the circuit board 10—radially inwardly offset with respect to the electrode 12:

Bores 20 whose interior has a metallic lining, e.g. by a corresponding vacuum deposition process, are located in the circuit board 10 arranged radially inwardly offset on a ring with respect to the electrode 12. These metal-lined bores 20 are electrically connected to the housing shell 22 via a metal material 18. The metal material 18 can e.g. be conductive foam.

As can be seen in FIG. 1, the housing shell 22 has an angled region 26 at the radially outer side of the circuit board 10. Overall, a shielding structure results in this manner which is formed from the metal-lined bores 20, from the annular material structure 18, from the two-dimensional surface of the housing shell 22 and from the angled region 26 of the housing shell 22.

A housing shell 122 is fixedly mounted to the drive motor 50 in the described embodiment. This housing shell 122 bears a structure which corresponds to and is disposed opposite the described structure which is provided in the housing shell 22. An electrode 112 is thus provided here on a circuit board region of a circuit board 110, said circuit board region being connected to the housing shell 122 via one or more insulating spacers 116. An annular structure of metal foam 118 connects the housing shell 122 to bores 120 which are arranged in ring shape in the circuit board 110 and have a metal lining. The housing shell 122 has an angled region 126 at its radially most outward region.

It can be recognized that the oppositely disposed electrodes 12 or 112 on the oppositely disposed circuit boards 10 or 110 are effectively shielded by the shielding structure which is formed by the housing shells 22, 122, by their angled regions 26, 126, by the structures of metal foam 18, 118 and by the metal-lined bores 10, 120 arranged in ring shape. The shielding is particularly effective to the outside when, as in the embodiment shown, the angled regions 26, 126 of the two housing shells 22, 122 overlap.

The housing shells 22, 122 and in particular the angled regions 26, 126 additionally form an effective capacitive coupling of the mass between the elements rotating relative to one another.

The already described lithographically produced coil windings 14 on the circuit board region 10' are provided radially within the structure having the electrodes 12. Coil windings 114, which like the coil windings 14 are produced lithographically on the respective circuit board, are disposed opposite these coil windings on the lower circuit board 110 in FIG. 1 in its region 110'. The same reference numeral 114 is used in the present text for the coil on the circuit board 110 and for the coil windings forming it for reasons of a simple representation.

The circuit board region 10' is surrounded by a ferrite structure 24 which is shown insulated in FIG. 3. It can be seen that this structure has angled regions 30, 32 which pass through the circuit board 10' (FIG. 1). In this respect, the outer angled section 32 only has cut-outs in the region, through which cut-outs the web regions of the circuit board 10 engage which connect the circuit board region 10' to the remaining circuit board.

The ferrite structure 24 in this manner has a particularly effective effect with a ferrite structure 124 at the other circuit board 110. The second ferrite structure 124 in this respect surrounds the circuit board region 110' of the second circuit board 110 in the same manner as the ferrite structure 24 surrounds the circuit board region 10' of the circuit board 10. In this manner, the inductive coupling between the oppositely disposed coils 14, 114 is amplified in an effective transformatory manner by the ferrite structures 24, 124. In addition, the ferrite structures 24, 124 additionally have a shielding effect in the manner such that the electrical coupling of the electrodes 12, 112 for the data transmission is not or is less interfered with by the inductive coupling between the coils 14 and 114.

The circuit board of FIG. 2 together with the ferrite structure of FIG. 3 can be seen in FIG. 4. The circuit board 10 is looked at in the same perspective here as in FIG. 2. The angled region 32 of the ferrite structure, which is shown in FIG. 3, projects through the corresponding recesses in the circuit board 10 between the inner region 10' and the outer region of the circuit board. The angled region 30 of the ferrite structure 24 is located radially within the circuit board region 10'. That respective side is shown in FIGS. 2 to 4 which is opposite the second circuit board 110 which has the same structures in the same arrangement.

The structures rotating relative to one another therefore comprise corresponding oppositely disposed elements, win in FIG. 1 the elements of the second structure repeating the reference symbols of the first structure ("xx") with a preceding 1 ("1 xxx").

In operation, the drive shaft 52 moves relative to the motor 50. In this respect, the housing shell 22, the circuit board 10, the electrode 12, and the coil windings 14 move together with the ferrite core 24 about the axis of rotation A. These elements therefore form the "rotor", whereas the fixed-position elements form the "stator" of the arrangement. The housing shell 112 is connected in a fixed-position to the motor 50 in the embodiment described. In this respect, the circuit board 110 with the electrode 112 and the coil windings 114 also does not move. A relative rotational movement therefore takes place between the coil windings 14 and 114 which provide an inductive coupling for the energy transmission. The oppositely disposed electrodes 12 and 112 are used for data transmission between the elements rotating relatively about the axis A.

For example, the drive motor 50 with the fixed-position housing shell 122 can be provided at the fixed-position part of a laser scanner, whereas the housing shell 22 with the elements connected thereto together with the drive shaft 52 rotates relative thereto.

The sensor head of the laser scanner can then e.g. be connected to the drive shaft 52. The apparatus in accordance with the invention then allows in an effective manner the energy transmission via the inductive coupling between the coils 14 and 114 and the data transmission from the sensor head to the fixed-position elements of the laser scanner via the electrodes 12 and 112.

On the relative rotational movement of the elements about the axis of rotation A, it is ensured despite the rotational movement that the electrodes 12, 112 and the data transmission taking place via them is effectively shielded toward the surroundings since the electrodes 12, 112 are surrounded on all sides by metal material, with the exception of that side which is disposed opposite the respective other conductor plate.

In the embodiment described, the data transmission via the electrodes 12, 112 radially outside the energy transmission via the coil windings 14, 114 is described. What is not shown, but is equally possible, is an arrangement in which the inductive energy transmission via the coil windings 14, 114 is provided radially outside the electrodes 12, 112, on the circuit board 10, 110. Otherwise, and in particular with respect to the shielding between the data transmission electrodes and the energy transmission coils, such an arrangement is analog to the one described above.

REFERENCE NUMERAL LIST 10, 110 circuit board
10', 110' radial inner region of the circuit board
11 radial web
12, 112 annular electrode
14, 114 coil, coil windings
16, 116 insulating spacer
18, 118 annular metallic foam structure
20, 120 metal-lined bores arranged in ring shape
22, 122 housing shell
24, 124 ferrite structure
26, 126 angled region of the housing shell
30, 130 radially inner angled region of the ferrite structure
32, 132 radially outer angled section of the ferrite structure
50 drive motor
52 drive shaft
A axis of the relative rotational movement

The invention claimed is:
1. An apparatus for contactless transmission of data and energy between a first object and a second object moving relative to one another about a common axis of rotation, wherein
   a) a first coil is provided at the first object;
   b) a second coil is provided at the second object and is disposed opposite and axially spaced apart from the first coil with respect to the common axis of rotation such that an energy transmission between the first and second coils is possible by inductive coupling;
   c) a first disk-shaped or annular disk-shaped electrode carrier having a first electrical conductor is provided coaxially to and rotationally fixed with respect to the first coil;
   d) a second disk-shaped or annular-disk shaped electrode carrier disposed opposite the first disk-shaped or annular disk-shaped electrode carrier and having a second electrical conductor is provided coaxially to and rotationally fixed with respect to the second coil, wherein the first and second electrical conductors are disposed opposite and axially spaced apart with respect to the common axis of rotation such that a data transmission is possible between the first and second electrical conductors by electrical coupling;

e) the first and second electrical conductors are circular or part-circular, with circles or part-circles being concentric to the common axis of rotation of the relative movement of the first and second objects;

f) coil windings of the first coil and of the first electrical conductor are arranged concentric to one another and, coil windings of the second coil and the second electrical conductor are arranged concentric to one another; and g) the first object comprises a first disk-shaped or annular disk-shaped coil carrier which bears the first coil and the second object comprises a second disk-shaped or annular disk shaped coil carrier which bears the second coil, wherein the first disk-shaped or annular disk-shaped coil carrier and the first disk-shaped or annular disk-shaped electrode carrier are in one piece and are formed by a first circuit board, and the second disk-shaped or annular disk-shaped coil carrier and the second disk-shaped or annular disk-shaped electrode carrier are in one piece and are formed by a second circuit board, further comprising a first arrangement of conductive material for the electrical shielding that is provided in a radial region between the first coil and the first electrical conductor and/or a second arrangement of conductive material for the electrical shielding that is provided in a radial region between the second coil and the second electrical conductor, in each case coaxially between the first and second coils and the first and second conductors, respectively, with the first and/or the second arrangement of conductive material for the electrical shielding respectively comprising bores in the first and second circuit boards in the radial region between the respective one of the first and second coils and of the first and second electrical conductors, in which the bores' conductive material is located.

2. The apparatus in accordance with claim 1, wherein the coil windings of the first coil are applied in a two-dimensional manner to the first circuit board and the coil windings of the second coil are applied in a two-dimensional manner to the second circuit board.

3. The apparatus in accordance with claim 1, further comprising a first housing shell of conductive material which is rotationally fixed to the first object.

4. The apparatus in accordance with claim 1, further comprising a second housing shell of conductive material which is rotationally fixed to the second object.

5. The apparatus in accordance with claim 1, further comprising a first housing shell of conductive material which is rotationally fixed to the first object, and a second housing shell of conductive material which is rotationally fixed to the second object.

6. The apparatus in accordance with claim 5, wherein the first housing shell is electrically connected to the first arrangement of conductive material for the electrical shielding between the first coil and the first electrical conductor and the second housing shell is electrically connected to the second arrangement of conductive material for the electrical shielding between the second coil and the second electrical conductor.

7. The apparatus in accordance with claim 6, wherein the first and second arrangements of conductive material comprises an annular structure in the radial region between the respective coil and the respective electrode, said annular structure being arranged coaxially to the common axis of rotation between the respective one of the first and second coil and the respective one of the first and second electrical conductor and is electrically conductively connected to the respective one of the first and second housing shell.

8. The apparatus in accordance with claim 5, wherein the first and second housing shells each comprise at least one disk-shaped region aligned perpendicular to the common axis of rotation and one angled region located radially outwardly therefrom, with the angled regions of the first and second housing shells being disposed radially spaced apart and next to one another.

9. The apparatus in accordance with claim 1, further comprising a first arrangement of magnetic material which surrounds the first coil at its radially outer periphery and/or which is arranged in its radial interior.

10. The apparatus in accordance with claim 9, wherein the first arrangement of magnetic material comprises ferrite.

11. The apparatus in accordance with claim 9, further comprising a second arrangement of magnetic material which at least surrounds the second coil at its radially outer periphery and/or is arranged in its radial interior and cooperates in a transformatory manner with the first arrangement of magnetic material.

12. The apparatus in accordance with claim 11, wherein the second arrangement of magnetic material comprises ferrite.

13. The apparatus in accordance with claim 9, wherein the first arrangement of magnetic material has at least one section which passes through the coil carrier.

14. The apparatus in accordance with claim 11, wherein the first and second arrangement of magnetic material has at least one section which passes through the coil carrier.

15. The apparatus in accordance with claim 1, further comprising one of a drive motor and a drive element of a drive motor that passes through the coil carriers to generate the relative movement of the two objects.

16. The apparatus in accordance with claim 1, wherein the material of the first arrangement of conductive material and the material of the second arrangement of conductive material are selected to be the same.

17. A laser scanner having the apparatus in accordance with claim 1 for the transmission of energy and data between a supply unit forming the first object and a sensor head rotatable relative thereto about the common axis of rotation and forming the second object.

* * * * *